United States Patent
Drumm

(10) Patent No.: US 8,426,799 B2
(45) Date of Patent: Apr. 23, 2013

(54) OPTICAL CONTROL SYSTEM WITH FEEDBACK CONTROL

(75) Inventor: Owen Drumm, Dublin (IE)

(73) Assignee: Rapt IP Limited, Gibraltar (GI)

( * ) Notice: Subject to any disclaimer, the term of this patent is extended or adjusted under 35 U.S.C. 154(b) by 245 days.

(21) Appl. No.: 13/059,792

(22) PCT Filed: Aug. 7, 2009

(86) PCT No.: PCT/EP2009/005738
§ 371 (c)(1),
(2), (4) Date: Feb. 18, 2011

(87) PCT Pub. No.: WO2010/015409
PCT Pub. Date: Feb. 11, 2010

(65) Prior Publication Data
US 2011/0157095 A1 Jun. 30, 2011

(30) Foreign Application Priority Data
Aug. 7, 2008 (IE) .................................. S2008/0653

(51) Int. Cl.
G06F 3/042 (2006.01)
G06M 7/00 (2006.01)

(52) U.S. Cl.
USPC ............ 250/221; 250/216; 345/173; 345/175

(58) Field of Classification Search .................. 250/221, 250/216, 206.1; 345/173, 175
See application file for complete search history.

(56) References Cited

U.S. PATENT DOCUMENTS

| | | | |
|---|---|---|---|
| 3,673,327 A | 6/1972 | Johnson et al. | |
| 4,243,879 A | 1/1981 | Carroll et al. | |
| 4,247,767 A | 1/1981 | O'Brien et al. | |
| 4,254,333 A | 3/1981 | Bergstrom | |
| 4,267,443 A | 5/1981 | Carroll et al. | |
| 4,301,447 A | 11/1981 | Funk et al. | |
| 4,384,201 A | 5/1983 | Carroll et al. | |
| 4,467,193 A | 8/1984 | Carroll | |
| 4,645,920 A | 2/1987 | Carroll et al. | |
| 4,672,364 A | 6/1987 | Lucas | |
| 4,684,801 A | 8/1987 | Carroll et al. | |
| 4,703,316 A | 10/1987 | Sherbeck | |

(Continued)

FOREIGN PATENT DOCUMENTS

| | | |
|---|---|---|
| EP | 0304820 A2 | 3/1989 |
| EP | 0601651 A1 | 6/1994 |

(Continued)

OTHER PUBLICATIONS

Cummings, T.F., "Transparent Keyless Keyboard for Variable Terminal Applications," IBM Technical Disclosure Bulletin, Sep. 1977, pp. 1609-1611, vol. 20, No. 4.

(Continued)

*Primary Examiner* — Tony Ko
(74) *Attorney, Agent, or Firm* — Fenwick & West LLP

(57) ABSTRACT

An optical control system is described which provides for more efficient operation of an optical device. The system is operable to provide an integrated output from the detection system. Accordingly, by controlling the operating time of the detection system of the optical device it is possible to match the dynamic range of the integrated output to the operational input range of an ADC means to provide a digital output value, thereby minimizing the quantization noise of the ADC means.

89 Claims, 8 Drawing Sheets

U.S. PATENT DOCUMENTS

| | | | |
|---|---|---|---|
| 4,713,534 A | 12/1987 | Masters et al. | |
| 4,746,770 A | 5/1988 | McAvinney | |
| 4,761,637 A | 8/1988 | Lucas et al. | |
| 4,782,327 A | 11/1988 | Kley et al. | |
| 4,794,248 A | 12/1988 | Gray | |
| 4,799,044 A | 1/1989 | Masters et al. | |
| 4,812,642 A | 3/1989 | Hasegawa et al. | |
| 4,818,859 A | 4/1989 | Hough | |
| 4,847,606 A | 7/1989 | Beiswenger | |
| 4,851,689 A | 7/1989 | Hasegawa et al. | |
| 4,855,590 A | 8/1989 | Bures et al. | |
| 4,893,120 A | 1/1990 | Doering et al. | |
| 4,899,138 A | 2/1990 | Araki et al. | |
| 4,912,316 A | 3/1990 | Yamakawa | |
| 4,943,806 A * | 7/1990 | Masters et al. | 341/31 |
| 4,963,859 A | 10/1990 | Parks | |
| 4,988,983 A | 1/1991 | Wehrer | |
| 4,990,901 A | 2/1991 | Beiswenger | |
| 5,036,187 A | 7/1991 | Yoshida et al. | |
| 5,136,156 A | 8/1992 | Nounen et al. | |
| 5,146,081 A | 9/1992 | Heikkinen et al. | |
| 5,355,149 A | 10/1994 | Casebolt | |
| 5,414,413 A | 5/1995 | Tamaru et al. | |
| 5,635,724 A | 6/1997 | Higgins | |
| 6,429,857 B1 | 8/2002 | Masters et al. | |
| 6,556,149 B1 | 4/2003 | Reimer et al. | |
| 6,597,348 B1 | 7/2003 | Yamazaki et al. | |
| 6,690,363 B2 | 2/2004 | Newton | |
| 6,727,887 B1 * | 4/2004 | Levine et al. | 345/158 |
| 6,765,193 B2 | 7/2004 | Sumriddetchkajorn | |
| 6,972,753 B1 | 12/2005 | Kimura et al. | |
| 7,265,748 B2 | 9/2007 | Ryynanen | |
| 7,295,329 B2 | 11/2007 | Gruhlke et al. | |
| 7,310,090 B2 | 12/2007 | Ho et al. | |
| 7,355,593 B2 | 4/2008 | Hill et al. | |
| 2004/0252091 A1 | 12/2004 | Ma et al. | |
| 2004/0263482 A1 | 12/2004 | Goertz | |
| 2006/0114237 A1 | 6/2006 | Crockett et al. | |
| 2006/0227120 A1 | 10/2006 | Eikman | |
| 2007/0165008 A1 | 7/2007 | Crockett | |
| 2008/0088603 A1 | 4/2008 | Eliasson et al. | |

FOREIGN PATENT DOCUMENTS

| | | |
|---|---|---|
| EP | 0747851 A2 | 12/1996 |
| GB | 2133537 A | 7/1984 |
| GB | 2171195 A | 8/1986 |

OTHER PUBLICATIONS

Baumann, D.D., "Optical Data Input Device," IBM Technical Disclosure Bulletin, Mar. 1969, pp. 1281-1282, vol. 11, No. 10.

Thompson, D.R., "Finger Position Detect Method," IBM Technical Disclosure Bulletin, Dec. 1980, p. 3289, vol. 23, No. 7B.

Callens, P., "Optical Keyboard Device and Technique," IBM Technical Disclosure Bulletin, Nov. 1983, pp. 2763-2764, vol. 26, No. 6.

"Enhanced Optical Touch Input Panel," IBM Technical Disclosure Bulletin, Sep. 1985, pp. 1760-1762, vol. 28, No. 4.

European Examination Report, European Application No. 09777734.6, Jun. 8, 2012, 5 pages.

PCT International Search Report and Written Opinion, PCT/EP2009/005739, Oct. 12, 2009, 9 Pages.

PCT International Search Report and Written Opinion, PCT/EP2009/005738, Dec. 10, 2009, 9 pages.

PCT International Preliminary Report on Patentability, PCT/EP2009/005738, Feb. 8, 2011, 10 pages.

* cited by examiner

Fig. 1 (known art)

(known art)

(known art)

FIG. 5 (known art)

OPTICAL CONTROL SYSTEM WITH FEEDBACK CONTROL

This invention relates to an optical control device, for example, a touch overlay for a display.

A touch overlay for a display can be constructed using an optically transparent sheet of material, such as acrylic or glass, placed in front of and parallel to the display screen. Optical emitters and detectors are arranged along the edges of the sheet such that light energy is coupled into the edge of the sheet by the emitters and travels via multiple intersecting optical paths through the sheet to the detectors, the light within the waveguide traversing the display screen at right angles to the light from the display, which passes through the thickness of the sheet.

The energy from the emitters is captive inside the sheet by total internal reflection (TIR), so the sheet acts as a planar waveguide. However, when using a material such as acrylic for the waveguide, the TIR is disrupted when the surface of the waveguide is touched by a finger and light energy is lost at the touch point by "leakage" from the waveguide. This is because the refractive index of the skin is much larger than that of air and the minimum angle of incidence at which TIR will occur is increased. The greater the area of skin contact, the more light is lost. Materials other than skin will also, to a lesser or greater degree, affect the TIR so that contact by suitable objects can be detected. By accurately measuring the amount of light passing through the waveguide, this loss can be detected to indicate that a touch has occurred. The position of the touch point can be determined by analysing which light transmission paths between the emitters and detectors have been affected. The position of the touch point can be correlated with the currently displayed image on the underlying display screen to control the latter, as is well known to those skilled in the art.

A touch overlay can also be constructed by arranging the optical paths between emitters and detectors to pass close to a touchable surface such that a touching object passes through one or more optical paths causing a reduction in light transmission along the affected optical paths.

The principles of construction and operation of a conventional touch panel of this type are shown in FIGS. 1 to 3. FIG. 1 shows a typical LED emitter 10 and photodetector 12 located at opposite edges of a rectangular planar waveguide 14. This will normally be a plastics material, chosen so that its refractive index is high enough to support total internal reflection at a boundary with air for reasonable angles of incidence. It is also chosen so that a finger touch disrupts this total internal reflection, causing reduced transmission across the waveguide. A light ray 16 is shown passing by total internal reflection from the emitter 10 to the detector 12. In practice, of course, there will be a plurality of emitters 10 and detectors 12 along the edges of the waveguide, of which for simplicity only four per edge are shown in FIGS. 2 and 3, so that light is received at the detectors via a large number of intersecting optical paths 18 from the emitters.

FIGS. 2 and 3 show a conventional arrangement where respective sets of emitters 10 are arranged along two adjacent edges of the waveguide 14 and respective sets of detectors 12 are arranged along the other two adjacent edges such that each set of detectors faces a respective set of emitters on the opposite edge of the waveguide. In this arrangement each detector 12 is arranged to receive light only from its directly opposite emitter 10, and correspondingly each emitter 10 is arranged to transmit light only to its directly opposite detector 12. Thus the optical paths 18 form an intersecting orthogonal grid and the X-Y coordinate of any given touch point which affects an intersection between optical paths can be determined by the particular combination of optical paths affected.

The emitters and detectors 10, 12 are driven by a CPU 20 via drive circuits 22 and acquisition circuits 28 respectively, the CPU also serving to process the received optical data, after analogue to digital conversion, to determine the location of a touch point. With multiple emitters and detectors arranged along the waveguide edges, there are many intersecting optical paths which can be measured for transmission loss. This means that a touch point at the intersection of optical paths can be determined quite precisely, since it will affect more than one optical path if the density of the optical paths is sufficiently high. Interpolation can be applied to the optical transmission data to determine the position of the touch between the beams (direct paths from emitters to detectors), giving total coverage of the touch area.

The beam data may be further processed to estimate the area of the touch, which can be used to supplement the touch position data, for example to determine whether the touch should trigger an event or not. The resolution of the system and the ability to detect small touch areas is determined primarily by the size of the waveguide, its thickness, the number of detectors, and the signal-to-noise ratio of the emitter signal as presented to the A/D converter. Since there are many optical paths in the waveguide, more than one touch can be detected at a time. This has some applications, such as providing the 'SHIFT' function on an alphanumeric touch keyboard.

Such a panel traversed by optical paths can, in addition to the detection of touch events, detect the operation of mechanical control devices arranged along the optical paths. For example, a mechanical button control may be inserted along an optical path whereby the button control presents a minimal attenuation to optical energy when the button actuator is in its resting position, but introduces significant optical attenuation when the button actuator is pressed. This may be accomplished by introducing an opaque vane into the optical path when the button is pressed. Various mechanical designs for control devices may be used to modulate the optical energy passing along the optical paths such that the status of such control devices can be detected by processing the signals from the optical detectors.

In such panels, which use multiple emitters and multiple detectors to provide sensing over a wide area, the emitters require significant current when operating and the photocurrent flowing in detectors configured for rapid response can also be considerable. This is in contrast to other sensing technologies, some of which, such as resistive touch sensing, consume negligible power.

Accordingly, the present invention provides an optical control system comprising:

a plurality of optical emitters and a detection system comprising a plurality of optical detectors, the optical emitters and the optical detectors defining therebetween an area of optical paths whereby the transmission of energy between an emitter and a detector may be modulated by an optical interaction occurring in the vicinity of said area, wherein the detection system is operable to provide an integrated output of one or more of said optical detectors over time;

switching means for controlling the operation of said detection system;

analogue to digital conversion (ADC) means for receiving and converting an output of said detection system to a digital value; and a feedback mechanism for receiving said digital value from said ADC means and for controlling the switching means in response thereto, to thereby adjust the dynamic range of the integrated output relative to the operational input range of said ADC means.

Preferably, the detection system comprises an integrator for receiving and integrating the output of one or more of said optical detectors over time, and wherein said switching means switching is operable to control the operation of said integrator and/or its associated detector(s).

In addition or alternatively, one or more of said optical detectors is configured with a relatively long response time, such that said one or more of said optical detectors acts as an integrator.

The aim of the feedback mechanism may be to minimise the quantisation noise of the ADC means by matching the dynamic range of the integrated output to the operational input range of said ADC means.

Optionally, the aim of the feedback mechanism may be to achieve a signal-to-noise ratio at the output of said ADC means (or at a subsequent point in the processing of measurement values from said ADC means) which is above a desired minimum value.

This will usually result in the minimum power consumption (because the integration time will be the shortest required for adequate noise performance and the emitters need only be active for the integration time), but the signal-to-noise ratio will be adequate, rather than optimal.

In the present specification the term "light" includes IR and UV radiation, and the term "optical" is to be interpreted accordingly.

Preferably, the system further includes a compensation circuit for providing a compensation charge to said integrator before or during a period of operation of said integrator, whereby said compensation charge operates to compensate for a background signal which is received from said one or more of said optical detectors but which is not associated with the operation of said optical emitters.

Further, preferably, said compensation charge is derived from a digital output value from the ADC means measured when the emitters transmitting energy received by said one or more detector(s) associated with said integrator are inactive.

Optionally, said compensation charge is derived from minimum digital output values from the ADC means measured when the emitters are driven with a modulating signal.

The system may also include a controller for controlling the operation of said integrator and said ADC means to controllably discharge and charge the integrator and to convert the integrated output to digital form.

Preferably, said integrator comprises a capacitor, and further comprising a sink to which said capacitor may be selectively connected under the control of said controller to controllably discharge said capacitor.

Further, preferably, said controller operates to control said integrator and said ADC means by reconfiguring a connection between said capacitor, said ADC means, and said sink, to one of three states selected from (i) a charge state in which said capacitor is isolated from said sink; (ii) a measurement state in which said capacitor is connected to said ADC means; and (iii) a discharge state in which said capacitor is connected to said sink.

Optionally, said ADC means is integrated into a device having an analogue input pin to which said capacitor is connected and which is reconfigurable under control of said controller to select one of said three states.

The controller may be further operable to select a fourth state in which said capacitor is connected to said compensation circuit for providing a compensation charge to said capacitor.

The controller may alternatively or additionally further be operable to select a fifth state in which said capacitor is isolated from both a charge path and a discharge path to provide a hold state.

Preferably, the system further includes a drive circuit for one or more of said optical emitters, said drive circuit being operable to pulse said one or more of said emitters with a pulse period less than said operational time of said integrator and/or its associated detector(s)

Where the amount of unwanted light energy receivable at the detectors is relatively small, adequate signal-to-noise performance can be achieved with very short integration times during which the emitters may be constantly active. The controller may not be able to operate the integrator at the minimum timescale which would yield an adequate signal-to-noise ratio, so the emitters may be active for longer than necessary and this would be wasteful of energy. For this and other reasons, it may be advantageous to be able to control the emitter duty cycle within the integration time.

The drive circuit may further comprise means for controlling a duty cycle of said one or more emitters such that the integrator output is approximately proportional to the emitter duty cycle.

Optionally, the optical control system further comprises means for determining a signal-to-noise ratio of said integrator output, and for controlling the emitter duty cycle to maintain said signal-to-noise ratio above a predetermined minimum value.

Preferably, said emitter drive circuit is operable to control a plurality of said emitters and to ensure that the activations of said plurality of emitters are staggered in time such that the number of emitters active at any given instant is reduced. Further preferably, the number of emitters active at any given instant is reduced to a minimum.

The area of optical paths may be positioned close to a touchable surface such that said optical interaction is the touching of said touchable surface. It will be understood that the area of optical paths may be provided in the air space or any other medium close to the surface.

Preferably, the touchable surface is the surface of a sheet waveguide and the emitters and detectors are arranged at the edges of the waveguide such that light is transmitted into the waveguide by the emitters and received by the detectors along said multiple intersecting optical paths by total internal reflection within the waveguide, the material of the waveguide being selected such that the amount of light passing along said at least two optical paths is reduced by an optical interaction involving touching said surface of the waveguide to cause leakage of light from the waveguide.

Preferably, said ADC means receives a plurality of multiplexed signals from a plurality of said detectors.

Preferably, the switching means controlling the operational time of a detector is adjustable as a function of the amplitude of signal detected by said detector.

The system may further comprise a processor for controlling the operation of said ADC means to sample said integrator output during an integration time of said integrator, and to predict from said sampling a predicted final integrator output at the end of said integration time.

Preferably, said processor is operable to determine whether said predicted final integrator output is likely to exceed an operational input limit of said ADC means, and if so, to reduce the integration time.

Further, preferably, said processor performs an interpolation of said sampled integrator output to determine a saturation time at which said operational limit of said ADC means is likely to be exceeded, and sets said reduced integration time to a value less than or equal to said saturation time.

Optionally, said processor is operable to determine whether said predicted final integrator output is likely to exceed an operational input limit of said ADC means, and if so, to supply said predicted final integrator output as an output in substitution for a saturated ADC output.

The invention also provides a method of operating an optical control system comprising the steps of:

transmitting energy from a plurality of optical emitters to a plurality of optical detectors, said emitters and detectors defining therebetween an area of optical paths whereby the transmission of energy between an emitter and a detector may be modulated by an optical interaction occurring in the vicinity of said area;

receiving the output of one or more of said optical detectors at an integrator and integrating the output signal over time;

controlling the time of operation of said integrator and/or its one or more detectors;

receiving an integrated output signal from said integrator and converting said integrated output signal to a digital value using an analog to digital converter (ADC) means;

controlling the switching means in response to said digital value, to thereby adjust the dynamic range of the integrator output relative to the operational input range of said ADC means.

Preferably, said controlling step comprises adjusting the range of the integrator output relative to the operation input range of said ADC means to achieve a signal-to-noise ratio above a minimum value.

In another independent aspect the invention provides an optical control system comprising:

a plurality of optical emitters and a plurality of optical detectors defining therebetween an area of optical paths whereby the transmission of energy between an emitter and a detector may be modulated by an optical interaction occurring in the vicinity of said area;

an integrator for receiving and integrating the output of one or more of said optical detectors over time;

analogue to digital conversion (ADC) means for receiving and converting an output of said integrator to a digital value; and a compensation circuit for providing a compensation charge to said integrator before or during a period of operation of said integrator, whereby said compensation charge operates to compensate for a background signal which is received from said one or more of said optical detectors but which is not associated with the operation of said optical emitters.

In a further independent aspect the invention provides an optical control system comprising:

a plurality of optical emitters and a plurality of optical detectors defining therebetween an area of optical paths whereby the transmission of energy between an emitter and a detector may be modulated by an optical interaction occurring in the vicinity of said area;

an integrator for receiving and integrating the output of one or more of said optical detectors over a predetermined integration time;

analogue to digital conversion (ADC) means for receiving and converting an output of said integrator to a digital value;

a processor for controlling the operation of said ADC means to sample said integrator output during said integration time of said integrator, and to predict from said sampling a predicted final integrator output at the end of said integration time.

Preferably, said processor is operable to determine whether said predicted final integrator output is likely to exceed an operational input limit of said ADC means, and if so, to reduce the integration time.

Optionally, said processor is operable to determine whether said predicted final integrator output is likely to exceed an operational input limit of said ADC means, and if so, to supply said predicted final integrator output as an output in substitution for a saturated ADC output.

In another independent aspect there is provided an optical control system comprising:

a plurality of optical emitters and a plurality of optical detectors defining therebetween an area of optical paths whereby the transmission of energy between an emitter and a detector may be modulated by an optical interaction occurring in the vicinity of said area;

circuitry for receiving a signal from one or more of said optical detectors and providing said a derived signal value therefrom in digital form;

a processor for receiving said derived signal value, said processor being operable to determine from said derived signal value a signal-to-noise ratio of said detector output, and to control the emitter power to maintain said signal-to-noise ratio above a predetermined minimum value.

Embodiments of the invention will now be described, by way of example, with reference to the accompanying drawings, in which.

Figure 1:
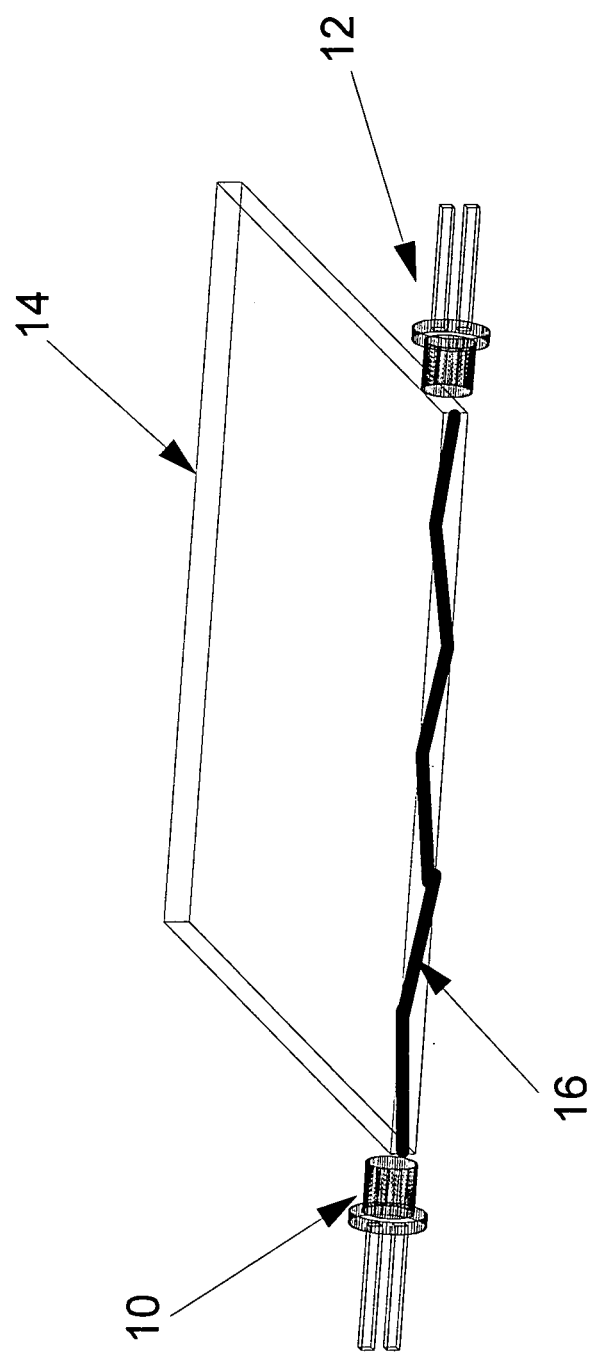
FIG. 1 (previously described) is a cut-away perspective view of a waveguide-type touch panel illustrating the principle of operation.
Figure 2:
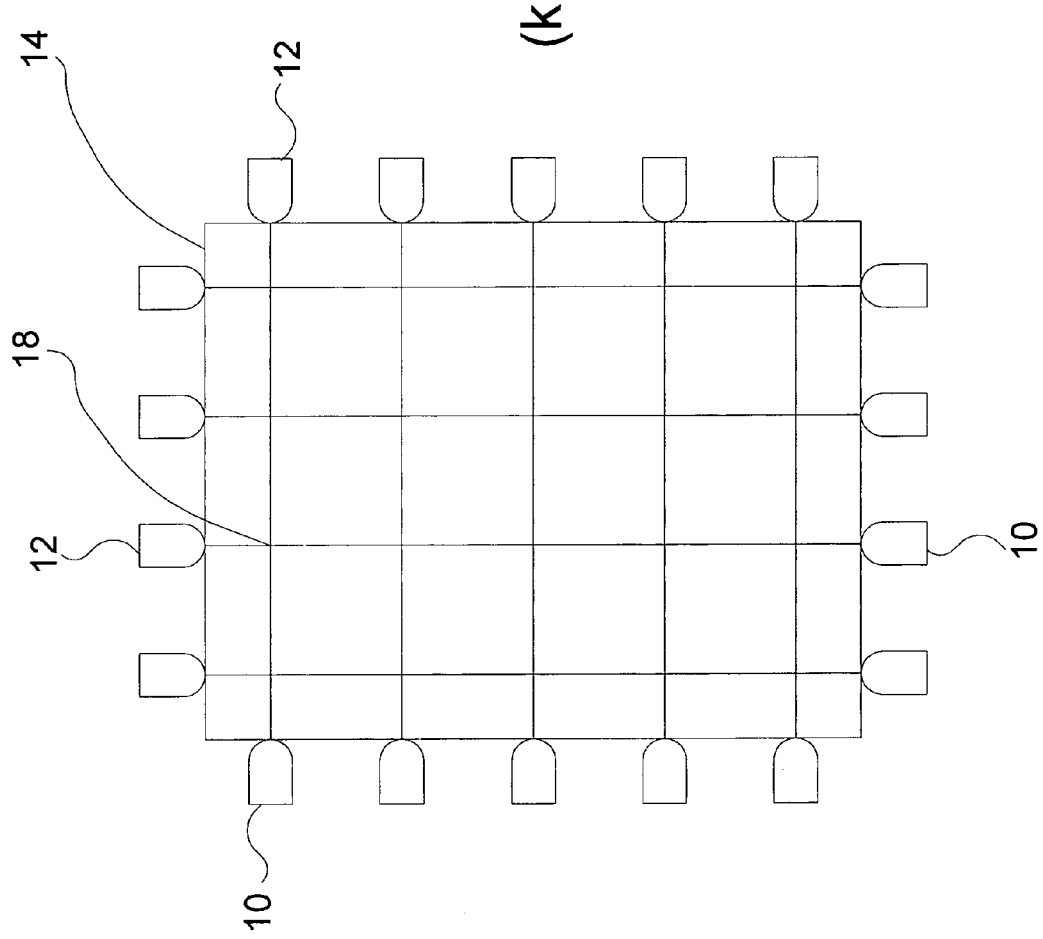
FIG. 2 (previously described) is a schematic plan view of a touch panel of the type shown in FIG. 1.
Figure 3:
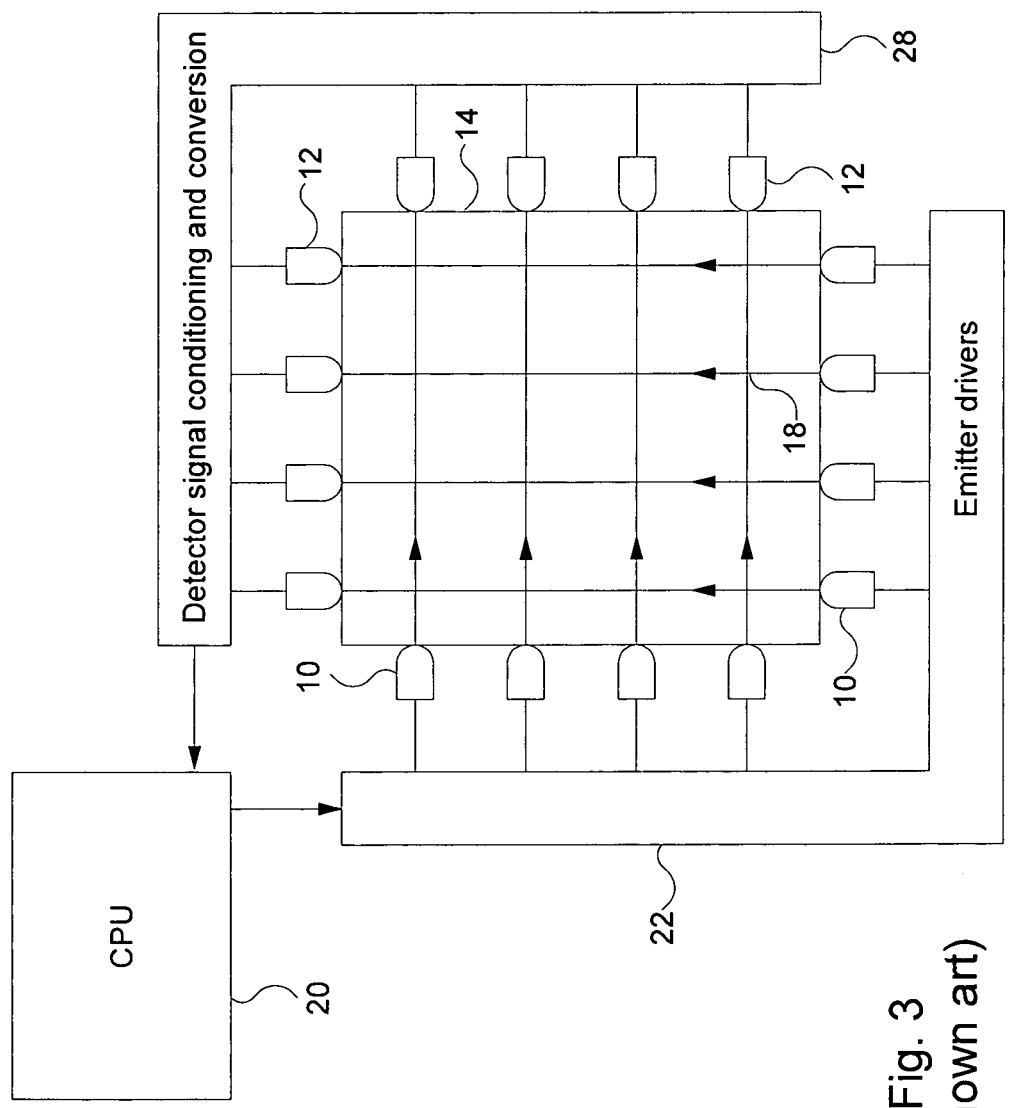
FIG. 3 (previously described) is a block diagram of the panel of FIG. 2 with associated control circuitry.

The embodiment of the invention relates to the emitter drivers 22 and the detector signal conditioning and conversion circuits 24 of the touch panel of FIG. 3. One embodiment is based on the fact that high gain optical detectors, such as phototransistors and photodarlingtons, are normally very much slower in operation than optical emitters such as LEDs, so it is possible to pulse an emitter at very high speed so that it is active within the response time of a detector which receives the radiant energy. The longer the operating period of the emitter, the larger the received signal at the detector output. In effect, the detector can be used to integrate the energy from an emitter over time. Additional components, such as a capacitor, may be added to act as an integrating charge accumulator. The clock speeds necessary for the digital circuit to control the emitter operating period are well within the range of standard digital devices.

The thermal mass of the emitter itself can prevent it from overheating when operating at high current for short periods. This means that the resistance usually provided in series with the emitter in conventional drive circuits can be very much reduced or removed altogether, and the consequent wasteful dissipation of power in heating the series resistor reduced or avoided.

A very fast microprocessor under software control could generate the timing patterns required to intermittently drive the emitters, but in many cases the processor will not have the required performance or this will constitute poor utilisation of CPU time. Thus, in the present embodiment the required timing is generated with relatively simple circuitry, FIG. 4, which is easily extended to drive multiple emitters in groups or individually.

Figure 4:
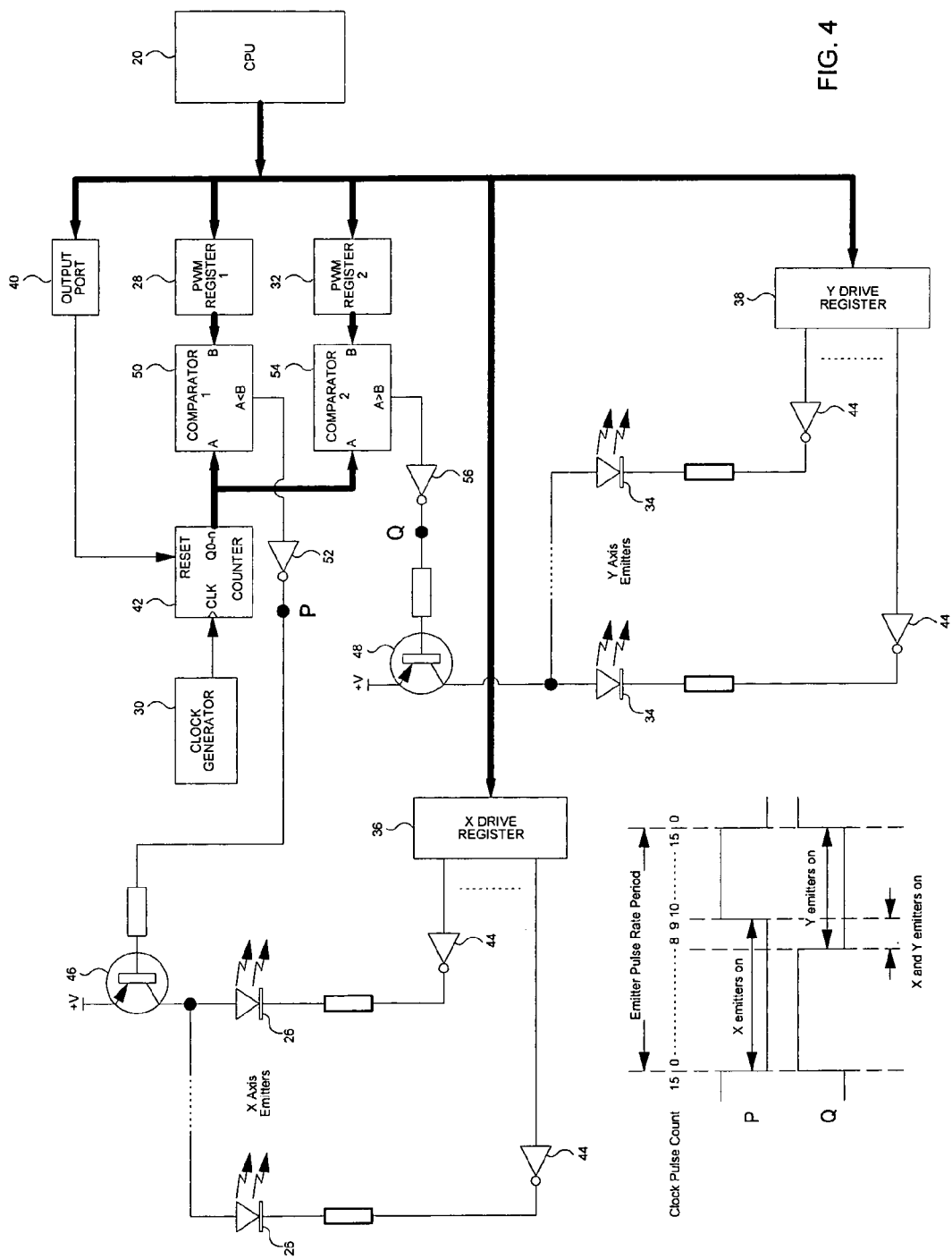
FIG. 4 is a block diagram of an emitter drive circuit according to an embodiment of the invention.

Referring to FIG. 4, the CPU 20 writes a value corresponding to the desired duration of the "on" or activation period of a first group of emitters 26 into a corresponding register 28. The value is specified in a number of clock pulses of a clock pulse generator 30. There is a corresponding register 32 for a second group of emitters 34. When the software determines that an activation period of the emitters 26 and 34 should begin, the CPU 20 writes a '1' value to those bits of output registers 36 and 38 for which the corresponding emitter is to be activated and writes a '0' value to the output port bit 40 which releases the synchronous reset line on a counter 42 so that it can commence counting pulses from the clock generator 30, starting at zero. The outputs of registers 36 and 38 are inverted by emitter drivers 44 to sink current from the cathodes of the emitters 26 and 34 when the respective common anode driving transistors 46 and 48 are switched on. For all non-zero values in register 28, the A<B output of a magnitude comparator 50 will go high when the counter 42 restarts at zero so that the output of an inverting buffer 52 goes low and the emitter driver transistor 46 is turned on. When the counter 42 output becomes equal to the value in register 28, the A<B output of the magnitude comparator 50 will go low, removing the drive to the emitters 26 and turning the latter off. The counter 42 continues to count until it reaches its maximum value, where it restarts with a value of zero. Thus the value written into the register 28 determines the activation or on period of the emitters 26 within the overall cycle period.

A second comparator 54 is provided for the second group of emitters 34 which compares the value in the register 32 with the output of counter 42. The output of comparator 54 is inverted by an inverting buffer 56 and turns on transistor 48 when the counter 42 has an output which is equal to or greater than the value in register 32.

For example, if a four-bit counter 42 is used, and it is desired to turn an emitter 26 on for the duration of 10 clock pulses and another emitter 34 on for the duration of 8 clock pulses, the CPU initially writes '1010' (binary 10) to the register 28 and '0111' (binary 7) to the register 32. When it is desired to start the emitter actuation period, a rising edge is sent to the reset pin of the counter 42, allowing it to count clock pulses from the clock pulse generator 30. The counter initialises its count at '0000', incrementing by 1 with every clock pulse from the clock pulse generator 30. The comparator 50 compares the output of the counter with the stored value in the register 28. While the counter output is less than '1010', the pin marked 'A<B' remains high, which is inverted at the input to the buffer 52, causing the transistor 46 to source current to the emitters 26, turning on any emitter for which there is a '1' bit in the register 36. Once the counter reaches a count of '1010', the 'A<B' pin goes low, causing the transistor 46 to turn off. While the transistor is off, no current is sourced and the emitters 26 will all be off.

Conversely, the pin marked 'A>B' on comparator 54 will remain low while the counter output is less than or equal to '0111' and that will hold transistor 48 off for the first 8 periods of clock pulse generator 30. Transistor 48 sources current to emitters 34, all of which will be turned off until the pin marked 'A>B' goes high. This happens when the output value of counter 42 reaches '1000', at which time the transistor 48 is turned on through the inverting action of a buffer 56, turning on any emitter for which there is a '1' bit in the register 38.

This embodiment allows the duration of the actuation period of the emitters 26 to be adjusted by setting a selected count in the register 28, as well as allowing similar control over the emitters 34 by setting a selected count in the register 32.

The group of emitters 26 and the group of emitters 34 may be active at the same time, but the duration of the overlap is kept to a minimum.

Although FIG. 4 shows the drive circuit for only two groups of emitters 26 and 34, there will be a similar drive circuit for any additional emitter groups for which separate power control is to be provided. The clock pulse generator 30 and counter 42 can be common to all the emitter groups, but there will need to be separate comparators and registers for each emitter group to control the emitter duty cycle within the group.

The activation of the emitters can be accomplished using pulse width modulation units on a commercially available microcontroller.

A related principle can be applied to the detectors 12 by activating the detectors for a limited time period to control the time for which the photocurrent flows.

Figure 5:
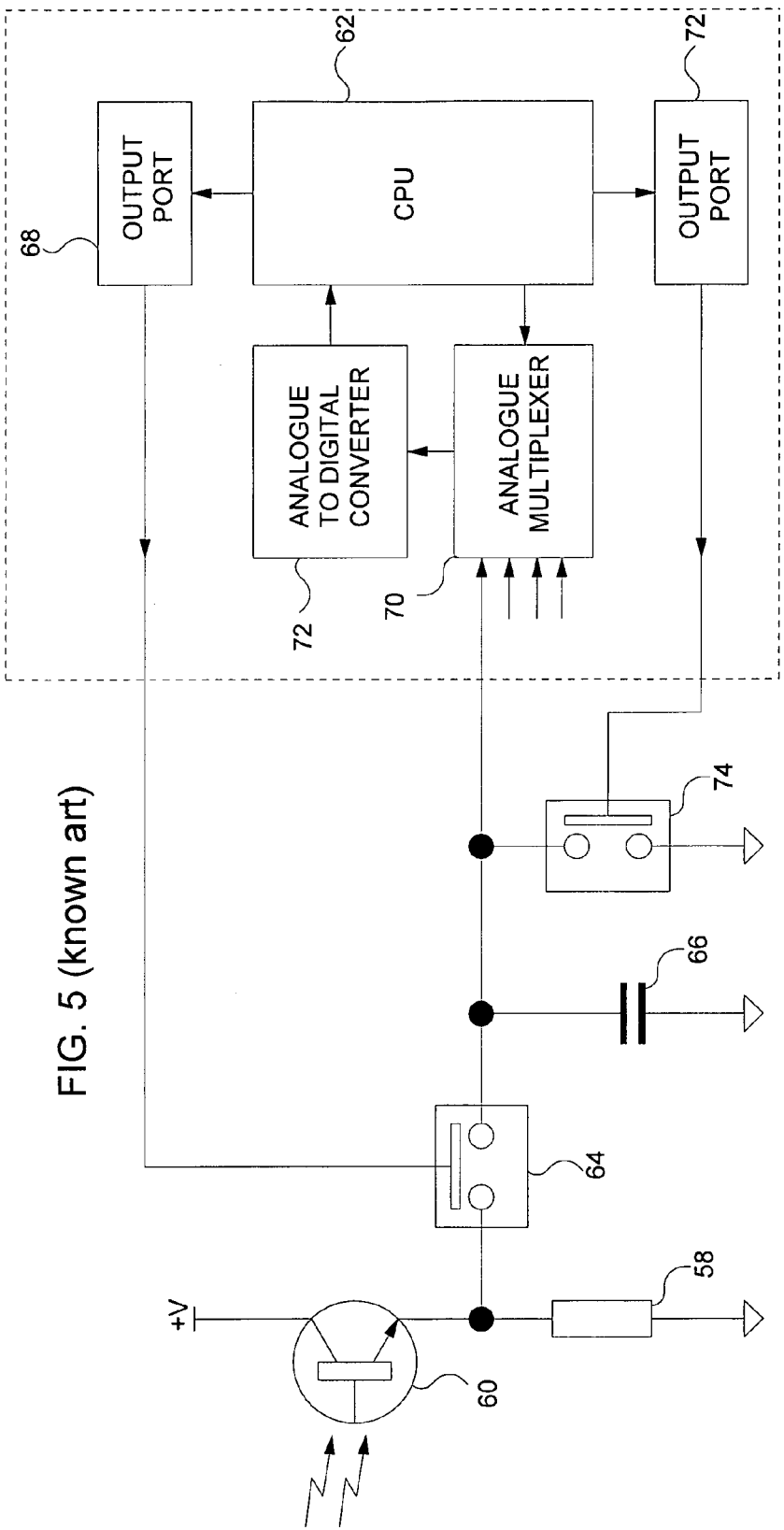
FIG. 5 is a block diagram of a detector drive circuit according to known art.

The number of analogue to digital (A/D) converters used to convert the analogue detector output data to digital form for processing by the CPU 20 can be reduced by multiplexing a number of detector outputs to a single A/D converter. For a given speed of converter, this will increase the time to convert all of the detector outputs. To allow the emitter power to be removed during conversion, the detector outputs are captured, and a conventional way of doing this would be to use a sample and hold circuit to retain the detected optical energy level in a capacitor. Turning the emitters off during the conversion time reduces overall power consumption. Normal practice would be to make use of an analogue switch to connect the detector output to a holding capacitor, using a resistor to convert the photocurrent into a voltage. FIG. 5 shows an example of such a conventional mechanism. A resistor 58 would convert the current from a detector 60 into a proportionate voltage. During the detector activation period the microcontroller CPU 62 would keep the analogue switch 64 closed so that the holding capacitor 66 tracks the detected voltage across resistor 58. The CPU 62 would control the analogue switch 64 by writing a 1-bit binary control value to output port 68. At the end of the detector activation period, the CPU 62 would open the analogue switch 64 so the holding capacitor 66 retains the last detected voltage. The CPU 62 would control an analogue multiplexer 70 so that the voltages detected by multiple detectors can be converted to digital values by the single analogue to digital converter 72. When the digital conversion is complete, the holding capacitor 66 would be discharged through analogue switch 74 which is controlled by the CPU 62 via output port 76. Analogue switch 74 would be opened again before the next sampling operation.

Figure 6:
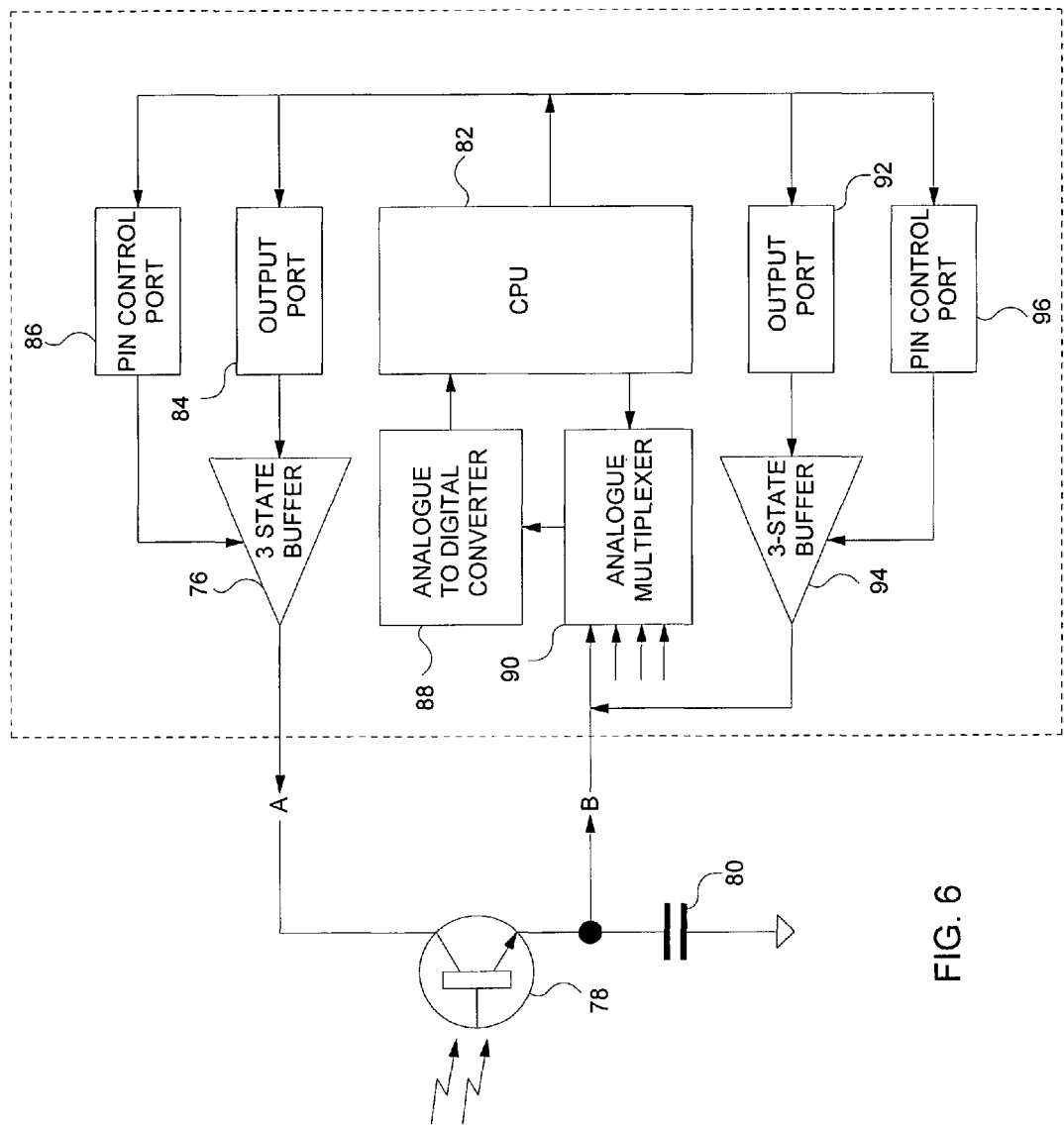
FIG. 6 is a block diagram of a detector drive circuit according to the embodiment of the invention.

However, in the present embodiment, FIG. 6, the detector circuit is simplified by using a tri-state logic output buffer 76 to drive the detector 78, so the detector can be placed in a high-impedance state when the emitters have been turned off. A capacitor 80 can then be connected directly to the detector output and used to retain the detector output voltage.

During the detector-activation period, the CPU 82 sources current to the detector 78 at node A by setting an output port 84 to a high level and by setting the corresponding pin control port 86 to enable the tri-state output buffer 76. The capacitor 80 is charged at a rate determined by the photocurrent through the detector 78, the photocurrent being dependent on the optical energy incident at the detector. The capacitor 80 is in effect an integrating capacitor during this time. At the end of the detector activation period, the CPU 82 removes the current source by setting the pin control port 86 to disable the tri-state output buffer 76, causing it to go to a high impedance state. This turns the detector off. The voltage then present on the capacitor 80 at point B is a function of the photocurrent and the time period for which the current source was available. Although there will be leakage of the charge on the capacitor 80 primarily through the microcontroller pin connected to point B, the capacitance value can be chosen so that the voltage droop will be within the precision of the analogue to digital converter 88 by the time the conversion is performed.

Preferably, the duration of the activation or "on" period of the detector 78 will be an integer number of activation periods of an emitter because incomplete cycles will reduce the linearity of the relationship between the emitter pulse duration and the accumulated detector value on capacitor 80. This non-linearity becomes less significant as the number of emitter cycles during the detector activation time increases.

As seen in FIG. 6, the voltage at point B is connected to one input of an analogue multiplexer 90 having a plurality of inputs connected to the respective points B of a plurality of detectors 78. These inputs are enabled in sequence by the CPU 82 so that the analogue voltages on the corresponding plurality of capacitors 80 are converted in turn by the A/D converter 88.

When the A/D conversion process for a detector 78 is complete, the capacitor 80 can be discharged by setting an output port 92 to a low condition and enabling a further tri-state buffer 94 by means of the pin control port 96. The capacitor 80 will normally have a small capacitance value and the tri-state buffer 94 will normally have a significant current sink capability, so the discharge time will be short. The tri-state output 94 is disabled by the CPU 82 during the detection and conversion times so that it does not disrupt the photocurrent measurement.

The dynamic range of the detector 78 can be adjusted under software control by the CPU 82 modifying the time period for which current is sourced from tri-state buffer 76. The output values of the analogue to digital converter 88 are used to provide feedback. Should the digital values from the detector 78 approach the upper limits available from the analogue to digital converter 88, the active period for the tri-state buffer 76 is reduced, hence reducing the charging period of the capacitor 80 and the resulting voltage presented to the analogue to digital converter 88 via analogue multiplexer 90.

Conversely, if the largest digital value generated over a successive set of measurements is not high in the range of analogue to digital converter 88, the active period of the tri-state buffer 76 is increased, to yield a higher voltage on capacitor 80 for greater conversion resolution and consequent reduction in quantisation noise. The CPU 82 can process the digital values over successive measurements to determine the ratio of wanted signal to unwanted noise (e.g. external noise and system noise). The active period of the tri-state buffer 76 is increased under control of the CPU 82 until this signal-to-noise ratio is above a predetermined minimum value.

Conversely, if the signal-to-noise ratio exceeds the minimum requirement by a significant margin, the active period of the tri-state buffer 76 may be reduced under control of the CPU 82. This introduces a closed-loop detection process, whereby the detection time is altered in order to provide acceptable signal-to-noise performance. Since the emitters can be disabled as soon as the tri-state buffer 76 is inactive, the operating period of the emitters and the associated current consumption will be at a minimum.

Even when the active period of the tri-state buffer 76 is the minimum which can be supported by the CPU 82 and the associated sampling system, further processing of the received values from the ADC 88 may reveal that the signal-to-noise ratio is still significantly above the required minimum value and the emitter output power can be automatically decreased without significantly degrading overall system performance.

The concept of controlling the emitter power based on detected signal-to-noise ratios rather than just on ambient light levels is applicable in other types of detection systems also (not just the described system involving an integrator). In any optical detection system there may be other sources of noise apart from ambient light, such as noise in the power lines within the system. By calculating the signal-to-noise ratio and basing the emitter power on that, all noise sources are included and the emitter power can be set appropriately.

For example, if optical sensing were used on a mobile phone, the RF injection into the PCB tracks from the detectors to the ADC pins may rise significantly during a phone call and, while the ambient light level may not change, the signal-to-noise ratio at the output of the processing would drop. This drop might be compensated for by increasing the emitter power. Although emitter duty cycle is the preferred way of controlling emitter power with an integrating detector, current control could be used with a non-integrating detection system.

In a further embodiment of the invention, it will be understood that a detector may be used which has a sufficiently long response time to act as an integrator, e.g. a detector with sufficient capacitance to act as an integrator.

Phototransistors tend to have a large base region in order to present a sizeable target for incident light. This gives rise to a collector-base junction capacitance which is typically much larger than that of an ordinary transistor, and is commonly the limiting factor in the response time of the device. When the detector 78 is a phototransistor, this intrinsic capacitance may be used as an integrating element in the present invention.

The CPU 82 can discharge the phototransistor 78 by driving node A to a high level and driving node B to a low level. The high level at node A is achieved by writing a binary one value to output port 84 and a binary one value to pin control port 86 to drive the output buffer 76 output to a high state. The low level at node B is achieved by writing a binary zero value to output port 92 and a high level to pin control port 96. Any charge on the collector-base junction of phototransistor 78 will cause a current to flow between node A and node B and this will discharge the collector-base junction of phototransistor 78.

The CPU 82 can configure the phototransistor 78 to integrate incident light by writing a binary zero value to the pin control port 86 so that node A is set to a high impedance state. Node B will normally be left at a low level. Incident light will charge the collector-base region of the phototransistor 78 while it is in this mode.

When the integration period is over, the CPU 82 writes a binary zero value to the pin control port 96 which sets the output of the tri-state buffer 94 to a high impedance state. The CPU 82 writes a binary one value to the pin control port 86 which, presuming a binary one value is retained in the output port 84, sets the output of the tri-state buffer 76 to a high level. This provides a current source for the phototransistor 78 so that any charge on the collector-base junction of the phototransistor 78 will give rise to a current with which to charge the capacitor 80. The charge on the capacitor 80 will be a product of the accumulated charge on the collector-base junction of the phototransistor 78 and the gain of the phototransistor 78.

When this charging process has completed, the CPU 82 can set node A to a high impedance state by writing a binary zero value to the pin control port 86. The capacitor 80 is then in a hold mode which retains the charge, with minimal leakage, so that the resulting voltage on the capacitor 80 can be presented via the analogue multiplexer 90 to the ADC 88.

If this hold mode is not required, the capacitor 80 may be replaced by a resistor so that the accumulated charge on the collector-base junction of the phototransistor 78 gives rise to a momentary current (again the product of the magnitude of the charge and the gain of the phototransistor 78) in the said resistor and a consequent voltage at node B which may be acquired by the ADC 88 via the analogue multiplexer 90.

In an additional aspect of the invention, the ADC 88 may take samples of the integrated charge during the integration period as directed by the software so that an estimate of the charging rate of the capacitor 80 can be made. If the charging rate is so high that the integrated charge at the end of the integration period saturates the ADC 88 input, the estimated charging rate can be used to determine the likely amount by which the integration period should be reduced to bring the next integration result within the input range of the ADC. The estimated charging rate can also be used to extrapolate a sample value which can be substituted for the saturated ADC sample value.

Figure 7:
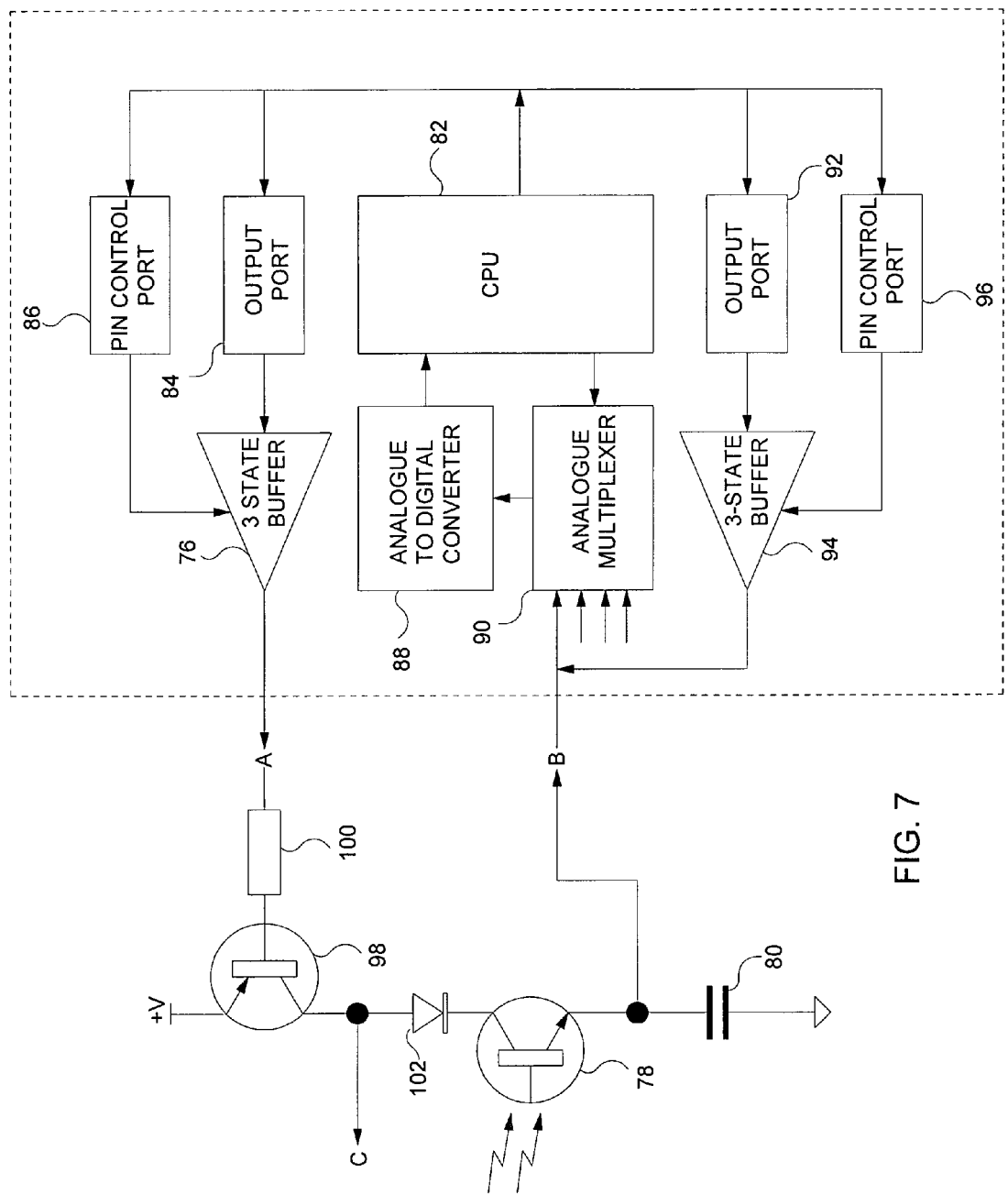
FIG. 7 is a block diagram of a modification of the detector drive circuit of FIG. 6.

As seen in FIG. 7, the detector current source node A can be used to provide current for more than one detector 78, i.e., the point C is connected to the collector pin of a plurality of detectors 78. Output pads on microcontroller devices commonly have a limited current source capability, so an external current amplifier may be used to increase the current available, e.g. a bipolar transistor 98 whose base is controlled by the output of the tri-state buffer 76 via a resistor 100. In this case, the output buffer 76 need not be a tri-state type if it is capable of generating a sufficiently high output voltage to ensure that the transistor 98 is fully off when the detectors 78 are to be made inactive. The CPU needs to write a '0' into output port 84 to turn on transistor 98.

FIG. 7 also shows the optional use of a diode 102 associated with the detector 78, which may be used to reduce leakage current between detectors when they are connected to a common power connection which may be switched off.

Sharing a single output pin in this way reduces the number of microcontroller pins required to support multiple detectors, though it does mean that the active period for each detector 78 will be the same, i.e., each detector connected to the point C receives voltage across its collector-emitter terminals at the same time. The integration time can still be individually controlled in software by instructing ADC 88 to perform conversions on each capacitor 80 as selected by analogue multiplexer 90 after the individually specified integration period.

Measures will normally be taken to limit the entry of ambient light into the waveguide and into the detector. These may take the form of opaque covers which restrict the passage of light other than along the intended paths between emitters and detectors, for example. However, it is common for some amount of ambient light to be present at the detector and this may result in a substantial constant or modulated offset to be present at the detector output. This offset will often be as large in amplitude as the signal from the emitter and makes poor use of the input range of the ADC.

Various means have been disclosed for minimising the offset signal, such as U.S. Pat. No. 4,684,801 (Carroll et al. 1987) which discloses the use of a sample and hold circuit and programmable differential amplifier to subtract the ambient detector output level sampled with the emitter inactive from the detector output level with the emitter active.

In another aspect of the present invention, offsets may be removed under software control by pre-charging the integrating capacitor with a charge corresponding to the size of the offset, but of opposite polarity. While the detector is active, the offset component of its output will neutralise this charge and the residual charge on the capacitor represents the difference between the offset compensation charge and the energy incident on the detector, primarily the desired energy from the emitter.

Figure 8:
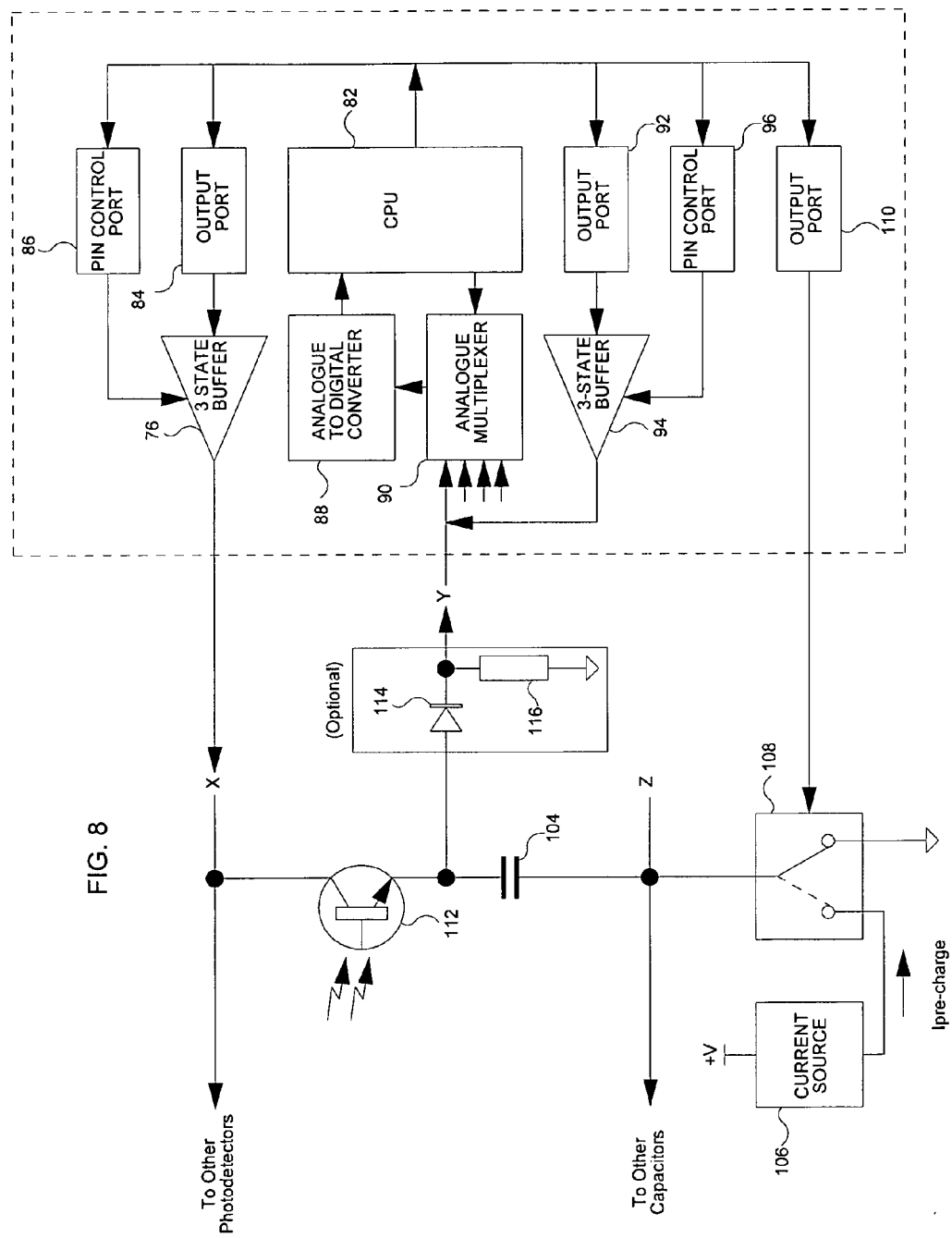
FIG. 8 is a block diagram of a modification of the detector drive circuit of FIG. 6.

FIG. 8 shows a preferred embodiment of the offset cancellation aspect of the invention. Nodes X, Y and Z control the various stages of the sampling process. First, the integrating capacitor 104 is discharged by driving nodes Y and Z to 0V while node X is at the same potential or a high impedance state. The capacitor 104 is then charged with an offset compensation pre-charge by applying a positive voltage to node Z via a current limiting device such as a resistor or current source 106 while retaining node Y at or close to zero potential. The charging current may be controllably applied to node Z using an analogue selector 108 or other suitable switching means. The charging current switch is controlled by CPU 82 by writing to an output port 110. The duration of the charging time will determine the resulting pre-charge on the capacitor 104. The detection and integration process is as previously described, where node X is raised to a positive potential to activate the detector 112 which charges the capacitor 104, with node Z at zero potential and node Y in a high impedance state. After the specified integration time, the voltage on the capacitor 104 can be sampled by switching node Y to become an analogue input to the microcontroller ADC. The resulting sample value corresponds to the charge accumulated in the capacitor 104 after the offset pre-charge has been neutralised.

The offset pre-charge of the capacitor 104 can be adjusted under software control by the CPU 82 modifying the time period for which node Y is at zero potential while the pre-charging current is applied to node Z. The output values of the analogue to digital converter 88 are used to provide feedback. Should the digital values from the detector 112 approach the lower limits available from the analogue to digital converter 88, the active period for node Y is increased, hence increasing the charging period of the capacitor 104 and the resulting pre-charge size to be neutralised by the offset component of the detector 112 output. Conversely, if a measurement is very low in the range of analogue to digital converter 88, the offset pre-charge is too large and the active period of node Y is decreased to yield a smaller pre-charge on capacitor 104.

Nodes X and Z may be common to several detectors and their respective integrating capacitors and the configuration shown in FIG. 8 has the particular advantage that only one microcontroller pin is required for each detector.

Optionally, a diode 114 and a resistor 116 may be added to the ADC input to protect it from negative voltages which will otherwise be present on node Y as a result of the pre-charging operation. If these parts are added, the pre-charging of the capacitor 104 is terminated by driving node Y to the same potential as node X rather than by setting node Y to a high impedance state.

This method of offset compensation by pre-charging of an integration capacitor with an inverse charge can also advantageously be applied in other embodiments such as an integrator based around an operational amplifier, for example.

Therefore, the present invention can make use of up to three closed loops to control emitter power, detector sensitivity and ambient light compensation with a minimum of electronic components. These loops are driven by the signal-to-noise ratio at the detectors, the maximum values at the ADC output and the minimum values at the ADC output respectively. They are implemented as independent systems but may interact inasmuch as each one can affect the driving parameter controlling the others.

The ability to control the active periods of both the emitters and detectors in an optical scanning system provides a means of reducing power consumption. It also allows the dynamic range of the signals arriving at the detectors to be controlled so that the performance required of the detector itself and the subsequent processing can be reduced for reduced cost. The methods presented here are suited to digital implementation, so that they may be integrated with other digital processing circuitry without the need for mixed-signal techniques. Thus the number of discrete components may be kept low.

Although the foregoing has described an embodiment of the invention where a planar waveguide is used through which the light passes from the emitters to the detectors by total internal reflection, the invention is equally applicable to the case where no waveguide is used and the light travels through the air closely across and substantially parallel to the surface of the display screen or other touchable detection surface. In such a case the light passing along intersecting optical paths will be interrupted by touching the detection surface at the intersection of the paths. This interruption can be detected by the CPU 20 in a similar way to the detection of the reduction in the amount of light passing through the planar waveguide when the surface of the latter is touched at the intersection of optical paths.

Also, even when a waveguide is used it is not necessary that it be a planar sheet. It could be a curved sheet, provided that its curvature is not so great that it cannot support total internal reflection of the light emitted by the emitters.

Furthermore, it is not necessary that embodiments using a planar or curved sheet waveguide be used as an overlay for a display screen. They could be used as standalone control devices, with markings on the surface of the waveguide indicating different touch points for different functions.

In the foregoing the invention has been described in relation to a conventional arrangement where the emitters and detectors are arranged on all four edges of a waveguide in two perpendicular linear arrays each providing one axis of an X-Y coordinate system. However, the invention is applicable to an arrangement wherein the emitters and detectors are arranged only along two opposite edges of a waveguide, with each emitter emitting light along multiple optical paths to multiple detectors and each detector receiving light along multiple optical paths from multiple emitters. In this case more than two optical paths may intersect at certain points.

A panel traversed by optical paths can, in addition to the detection of touch events, detect the operation of mechanical control devices arranged along the optical paths. For example, a mechanical button control may be inserted along an optical path whereby the button control presents a minimal attenuation to optical energy when the button actuator is in its resting position, but introduces significant optical attenuation when the button actuator is pressed. This may be accomplished by introducing an opaque vane into the optical path when the button is pressed. Various mechanical designs for control devices may be used to modulate the optical energy passing along the optical paths such that the status of such control devices can be detected by processing the signals from the optical detectors.

The invention is not limited to the embodiments described herein which may be modified or varied without departing from the scope of the invention.

The invention claimed is:

1. An optical control system comprising:
   a plurality of optical emitters and a detection system comprising a plurality of optical detectors, the optical emitters and the optical detectors defining therebetween an area of optical paths whereby the transmission of energy between an emitter and a detector may be modulated by an optical interaction occurring in the vicinity of said area, wherein the detection system comprises an integrator operable to receive and integrate an output of one or more of said optical detectors over time;
   a switch operable to control the operation of said detection system, wherein said switch is operable to control the operation of said integrator and/or its associated detector(s);
   an analogue to digital converter (ADC) configured to receive and convert an output of said detection system to a digital value; and
   a feedback mechanism for receiving said digital value from said ADC and for controlling the switch in response thereto, to thereby adjust the dynamic range of the integrated output relative to the operational input range of said ADC.

2. An optical control system as claimed in claim 1, further comprising a compensation circuit for providing a compensation charge to said integrator before or during a period of operation of said integrator, whereby said compensation charge operates to compensate for a background signal which is received from said one or more of said optical detectors but which is not associated with the operation of said optical emitters.

3. An optical control system as claimed in claim 2, wherein said compensation charge is derived from a digital output value from the ADC measured when the emitters transmitting energy received by said one or more detector(s) associated with said integrator are inactive.

4. An optical control system as claimed in claim 2, further comprising a controller for controlling the operation of said detection system and said ADC to controllably discharge and charge the detection system and to convert the integrated output to digital form.

5. An optical control system as claimed in claim 4, wherein said detection system comprises a capacitor, and further comprising a sink to which said capacitor may be selectively connected under the control of said controller to controllably discharge said capacitor.

6. An optical control system as claimed in claim 5, wherein said controller operates to control said detection system and said ADC by reconfiguring a connection between said capacitor, said ADC, and said sink, to one of three states selected from (i) a charge state in which said capacitor is isolated from said sink; (ii) a measurement state in which said capacitor is connected to said ADC; and (iii) a discharge state in which said capacitor is connected to said sink.

7. An optical control system as claimed in claim 6, wherein said ADC is integrated into a device having an analogue input pin to which said capacitor is connected and which is reconfigurable under control of said controller to select one of said three states.

8. An optical control system as claimed in claim 6, wherein said controller is further operable to select a fourth state in which said capacitor is connected to said compensation circuit for providing a compensation charge to said capacitor.

9. An optical control system as claimed in claim 6, wherein said controller is further operable to select a fifth state in which said capacitor is isolated from both a charge path and a discharge path to provide a hold state.

10. An optical control system as claimed in claim 1, further comprising an emitter drive circuit for one or more of said optical emitters, said emitter drive circuit being operable to pulse said one or more of said emitters with a pulse period less than an operational time of said detection system.

11. An optical control system as claimed in claim 10, wherein said emitter drive circuit is further configured to control a duty cycle of said one or more emitters such that the detection system output is approximately proportional to the emitter duty cycle.

12. An optical control system as claimed in claim 11, wherein said emitter drive circuit is further configured to determine a signal-to-noise ratio of said detection system output, and to control the emitter duty cycle to maintain said signal-to-noise ratio above a predetermined minimum value.

13. An optical control system as claimed in claim 10, wherein said emitter drive circuit is operable to control a plurality of said emitters and to ensure that the activations of said plurality of emitters are staggered in time such that the number of emitters active at any given instant is reduced.

14. An optical control system as claimed in claim 1, wherein said area of optical paths is positioned close to a touchable surface and wherein said optical interaction is the touching of said touchable surface.

15. An optical control system as claimed in claim 14, wherein the touchable surface is the surface of a sheet waveguide and the emitters and detectors are arranged at the edges of the waveguide such that light is transmitted into the waveguide by the emitters and received by the detectors along said multiple intersecting optical paths by total internal reflection within the waveguide, the material of the waveguide being selected such that the amount of light passing along said at least two optical paths is reduced by an optical interaction involving touching said surface of the waveguide to cause leakage of light from the waveguide.

16. An optical control system as claimed in claim 1, wherein said ADC receives a plurality of multiplexed signals from a plurality of said detectors.

17. An optical control device as claimed claim 1, wherein the switch is configured to control an operational time of the detection system, and wherein the switch is adjustable as a function of the amplitude of signal detected by said detection system.

18. An optical control device as claimed in claim 1, further comprising a processor for controlling the operation of said ADC to sample said detection system output during an integration time of said detection system, and to predict from said sampling a predicted final detection system output at the end of said integration time.

19. An optical control system as claimed in claim 18, wherein said processor is operable to determine whether said predicted final detection system output is likely to exceed an operational input limit of said ADC, and if so, to reduce the integration time.

20. An optical control system as claimed in claim 19, wherein said processor performs an interpolation of said sampled detection system output to determine a saturation time at which said operational limit of said ADC is likely to be exceeded, and sets said reduced integration time to a value less than or equal to said saturation time.

21. An optical control system as claimed in claim 18, wherein said processor is operable to determine whether said predicted final detection system output is likely to exceed an operational input limit of said ADC, and if so, to supply said predicted final detection system output as an output in substitution for a saturated ADC output.

22. An optical control system as claimed in claim 1, wherein one or more of said optical detectors is configured with a relatively long response time, such that said one or more of said optical detectors acts as an integrator.

23. A method of operating an optical control system comprising the steps of:
transmitting energy from a plurality of optical emitters to a detection system comprising a plurality of optical detectors, said emitters and detectors defining therebetween an area of optical paths whereby the transmission of energy between an emitter and a detector may be modulated by an optical interaction occurring in the vicinity of said area, wherein the detection system comprises an integrator operable to receive and integrate an output of one or more of said optical detectors over time;
controlling the operation of at least a portion of said detection system with a switch, the portion including the operation of said integrator and/or its associated detector(s);
receiving an integrated output signal from said detection system and converting said integrated output signal to a digital value using an analog to digital converter (ADC);
controlling the switch in response to said digital value, to thereby adjust the dynamic range of the detection system output relative to the operational input range of said ADC.

24. An optical control system comprising:
a plurality of optical emitters and a detection system comprising a plurality of optical detectors, the optical emitters and the optical detectors defining therebetween an area of optical paths whereby the transmission of energy between an emitter and a detector may be modulated by an optical interaction occurring in the vicinity of said area, wherein the detection system operable to provide an integrated output of one or more of said optical detectors over time;
a switch operable to control the operation of said detection system;
an analogue to digital converter (ADC) configured to receive and convert an output of said detection system to a digital value;
a feedback mechanism for receiving said digital value from said ADC and for controlling the switch in response thereto, to thereby adjust the dynamic range of the integrated output relative to the operational input range of said ADC; and
an emitter drive circuit for one or more of said optical emitters, said emitter drive circuit being operable to pulse said one or more of said emitters with a pulse period less than an operational time of said detection system.

25. An optical control system as claimed in claim 24, wherein the detection system comprises an integrator for receiving and integrating the output of one or more of said optical detectors over time, and wherein said switch is operable to control the operation of said integrator and/or its associated detector(s).

26. An optical control system as claimed in claim 25, further comprising a compensation circuit for providing a compensation charge to said integrator before or during a period of operation of said integrator, whereby said compensation charge operates to compensate for a background signal which is received from said one or more of said optical detectors but which is not associated with the operation of said optical emitters.

27. An optical control system as claimed in claim 26, wherein said compensation charge is derived from a digital output value from the ADC measured when the emitters transmitting energy received by said one or more detector(s) associated with said integrator are inactive.

28. An optical control system as claimed in claim 26, further comprising a controller for controlling the operation of said detection system and said ADC to controllably discharge and charge the detection system and to convert the integrated output to digital form.

29. An optical control system as claimed in claim 28, wherein said detection system comprises a capacitor, and further comprising a sink to which said capacitor may be selectively connected under the control of said controller to controllably discharge said capacitor.

30. An optical control system as claimed in claim 29, wherein said controller operates to control said detection system and said ADC by reconfiguring a connection between said capacitor, said ADC, and said sink, to one of three states selected from (i) a charge state in which said capacitor is isolated from said sink; (ii) a measurement state in which said capacitor is connected to said ADC; and (iii) a discharge state in which said capacitor is connected to said sink.

31. An optical control system as claimed in claim 30, wherein said ADC is integrated into a device having an analogue input pin to which said capacitor is connected and which is reconfigurable under control of said controller to select one of said three states.

32. An optical control system as claimed in claim 30, wherein said controller is further operable to select a fourth state in which said capacitor is connected to said compensation circuit for providing a compensation charge to said capacitor.

33. An optical control system as claimed in claim 30, wherein said controller is further operable to select a fifth state in which said capacitor is isolated from both a charge path and a discharge path to provide a hold state.

34. An optical control system as claimed in claim 24, wherein said emitter drive circuit is further configured to control a duty cycle of said one or more emitters such that the detection system output is approximately proportional to the emitter duty cycle.

35. An optical control system as claimed in claim 34, wherein said emitter drive circuit is further configured to determine a signal-to-noise ratio of said detection system output, and to control the emitter duty cycle to maintain said signal-to-noise ratio above a predetermined minimum value.

36. An optical control system as claimed in claim 24, wherein said emitter drive circuit is operable to control a plurality of said emitters and to ensure that the activations of said plurality of emitters are staggered in time such that the number of emitters active at any given instant is reduced.

37. An optical control system as claimed in claim 24, wherein said area of optical paths is positioned close to a touchable surface and wherein said optical interaction is the touching of said touchable surface.

38. An optical control system as claimed in claim 37, wherein the touchable surface is the surface of a sheet waveguide and the emitters and detectors are arranged at the edges of the waveguide such that light is transmitted into the waveguide by the emitters and received by the detectors along said multiple intersecting optical paths by total internal reflection within the waveguide, the material of the waveguide being selected such that the amount of light passing along said at least two optical paths is reduced by an optical interaction involving touching said surface of the waveguide to cause leakage of light from the waveguide.

39. An optical control system as claimed in claim 24, wherein said ADC receives a plurality of multiplexed signals from a plurality of said detectors.

40. An optical control device as claimed claim 24, wherein the switch is configured to control the operational time of the detection system, and wherein the switch is adjustable as a function of the amplitude of signal detected by said detection system.

41. An optical control device as claimed in claim 24, further comprising a processor for controlling the operation of said ADC to sample said detection system output during an integration time of said detection system, and to predict from said sampling a predicted final detection system output at the end of said integration time.

42. An optical control system as claimed in claim 41, wherein said processor is operable to determine whether said predicted final detection system output is likely to exceed an operational input limit of said ADC, and if so, to reduce the integration time.

43. An optical control system as claimed in claim 42, wherein said processor performs an interpolation of said sampled detection system output to determine a saturation time at which said operational limit of said ADC is likely to be exceeded, and sets said reduced integration time to a value less than or equal to said saturation time.

44. An optical control system as claimed in claim 41, wherein said processor is operable to determine whether said predicted final detection system output is likely to exceed an operational input limit of said ADC, and if so, to supply said predicted final detection system output as an output in substitution for a saturated ADC output.

45. An optical control system as claimed in claim 24, wherein one or more of said optical detectors is configured with a relatively long response time, such that said one or more of said optical detectors acts as an integrator.

46. An optical control system comprising:
  a plurality of optical emitters and a detection system comprising a plurality of optical detectors, the optical emitters and the optical detectors defining therebetween an area of optical paths whereby the transmission of energy between an emitter and a detector may be modulated by an optical interaction occurring in the vicinity of said area, wherein the detection system operable to provide an integrated output of one or more of said optical detectors over time;
  a switch operable to control an operational time of said detection system, wherein the switch is adjustable as a function of the amplitude of signal detected by said detection system;
  analogue to digital converter (ADC) configured to receive and convert an output of said detection system to a digital value; and
  a feedback mechanism for receiving said digital value from said ADC and for controlling the switch in response thereto, to thereby adjust the dynamic range of the integrated output relative to the operational input range of said ADC.

47. An optical control system as claimed in claim 46, wherein the detection system comprises an integrator for receiving and integrating the output of one or more of said optical detectors over time, and wherein said switch is operable to control the operation of said integrator and/or its associated detector(s).

48. An optical control system as claimed in claim 47, further comprising a compensation circuit for providing a compensation charge to said integrator before or during a period of operation of said integrator, whereby said compensation charge operates to compensate for a background signal which is received from said one or more of said optical detectors but which is not associated with the operation of said optical emitters.

49. An optical control system as claimed in claim 48, wherein said compensation charge is derived from a digital output value from the ADC measured when the emitters transmitting energy received by said one or more detector(s) associated with said integrator are inactive.

50. An optical control system as claimed in claim 48, further comprising a controller for controlling the operation of said detection system and said ADC to controllably discharge and charge the detection system and to convert the integrated output to digital form.

51. An optical control system as claimed in claim 50, wherein said detection system comprises a capacitor, and further comprising a sink to which said capacitor may be selectively connected under the control of said controller to controllably discharge said capacitor.

52. An optical control system as claimed in claim 51, wherein said controller operates to control said detection system and said ADC by reconfiguring a connection between said capacitor, said ADC, and said sink, to one of three states selected from (i) a charge state in which said capacitor is isolated from said sink; (ii) a measurement state in which said capacitor is connected to said ADC; and (iii) a discharge state in which said capacitor is connected to said sink.

53. An optical control system as claimed in claim 52, wherein said ADC is integrated into a device having an analogue input pin to which said capacitor is connected and which is reconfigurable under control of said controller to select one of said three states.

54. An optical control system as claimed in claim 52, wherein said controller is further operable to select a fourth state in which said capacitor is connected to said compensation circuit for providing a compensation charge to said capacitor.

55. An optical control system as claimed in claim 52, wherein said controller is further operable to select a fifth state in which said capacitor is isolated from both a charge path and a discharge path to provide a hold state.

56. An optical control system as claimed in claim 46, further comprising an emitter drive circuit for one or more of said optical emitters, said emitter drive circuit being operable to pulse said one or more of said emitters with a pulse period less than the operational time of said detection system.

57. An optical control system as claimed in claim 56, wherein said emitter drive circuit is further configured to control a duty cycle of said one or more emitters such that the detection system output is approximately proportional to the emitter duty cycle.

58. An optical control system as claimed in claim 57, wherein said emitter drive circuit is further configured to determine a signal-to-noise ratio of said detection system output, and to control the emitter duty cycle to maintain said signal-to-noise ratio above a predetermined minimum value.

59. An optical control system as claimed in claim 56, wherein said emitter drive circuit is operable to control a plurality of said emitters and to ensure that the activations of said plurality of emitters are staggered in time such that the number of emitters active at any given instant is reduced.

60. An optical control system as claimed in claim 46, wherein said area of optical paths is positioned close to a touchable surface and wherein said optical interaction is the touching of said touchable surface.

61. An optical control system as claimed in claim 60, wherein the touchable surface is the surface of a sheet waveguide and the emitters and detectors are arranged at the edges of the waveguide such that light is transmitted into the waveguide by the emitters and received by the detectors along said multiple intersecting optical paths by total internal reflection within the waveguide, the material of the waveguide being selected such that the amount of light passing along said at least two optical paths is reduced by an optical interaction involving touching said surface of the waveguide to cause leakage of light from the waveguide.

62. An optical control system as claimed in claim 46, wherein said ADC receives a plurality of multiplexed signals from a plurality of said detectors.

63. An optical control device as claimed in claim 46, further comprising a processor for controlling the operation of said ADC to sample said detection system output during an integration time of said detection system, and to predict from said sampling a predicted final detection system output at the end of said integration time.

64. An optical control system as claimed in claim 63, wherein said processor is operable to determine whether said predicted final detection system output is likely to exceed an operational input limit of said ADC, and if so, to reduce the integration time.

65. An optical control system as claimed in claim 64, wherein said processor performs an interpolation of said sampled detection system output to determine a saturation time at which said operational limit of said ADC is likely to be exceeded, and sets said reduced integration time to a value less than or equal to said saturation time.

66. An optical control system as claimed in claim 63, wherein said processor is operable to determine whether said predicted final detection system output is likely to exceed an operational input limit of said ADC, and if so, to supply said predicted final detection system output as an output in substitution for a saturated ADC output.

67. An optical control system as claimed in claim 46, wherein one or more of said optical detectors is configured with a relatively long response time, such that said one or more of said optical detectors acts as an integrator.

68. An optical control system comprising:
a plurality of optical emitters and a detection system comprising a plurality of optical detectors, the optical emitters and the optical detectors defining therebetween an area of optical paths whereby the transmission of energy between an emitter and a detector may be modulated by an optical interaction occurring in the vicinity of said area, wherein the detection system operable to provide an integrated output of one or more of said optical detectors over time;
a switch operable to control the operation of said detection system;
an analogue to digital converter (ADC) configured to receive and convert an output of said detection system to a digital value;
a feedback mechanism for receiving said digital value from said ADC and for controlling the switch in response thereto, to thereby adjust the dynamic range of the integrated output relative to the operational input range of said ADC; and a processor for controlling the operation of said ADC to sample said detection system output during an integration time of said detection system, and to predict from said sampling a predicted final detection system output at the end of said integration time.

69. An optical control system as claimed in claim 68, wherein the detection system comprises an integrator for receiving and integrating the output of one or more of said optical detectors over time, and wherein said switch is operable to control the operation of said integrator and/or its associated detector(s).

70. An optical control system as claimed in claim 69, further comprising a compensation circuit for providing a compensation charge to said integrator before or during a period of operation of said integrator, whereby said compensation charge operates to compensate for a background signal which is received from said one or more of said optical detectors but which is not associated with the operation of said optical emitters.

71. An optical control system as claimed in claim 69, wherein said compensation charge is derived from a digital output value from the ADC measured when the emitters transmitting energy received by said one or more detector(s) associated with said integrator are inactive.

72. An optical control system as claimed in claim 69, further comprising a controller for controlling the operation of said detection system and said ADC to controllably discharge and charge the detection system and to convert the integrated output to digital form.

73. An optical control system as claimed in claim 72, wherein said detection system comprises a capacitor, and further comprising a sink to which said capacitor may be selectively connected under the control of said controller to controllably discharge said capacitor.

74. An optical control system as claimed in claim 73, wherein said controller operates to control said detection system and said ADC by reconfiguring a connection between said capacitor, said ADC, and said sink, to one of three states selected from (i) a charge state in which said capacitor is isolated from said sink; (ii) a measurement state in which said capacitor is connected to said ADC; and (iii) a discharge state in which said capacitor is connected to said sink.

75. An optical control system as claimed in claim 74, wherein said ADC is integrated into a device having an analogue input pin to which said capacitor is connected and which is reconfigurable under control of said controller to select one of said three states.

76. An optical control system as claimed in claim 74, wherein said controller is further operable to select a fourth state in which said capacitor is connected to said compensation circuit for providing a compensation charge to said capacitor.

77. An optical control system as claimed in claim 74, wherein said controller is further operable to select a fifth state in which said capacitor is isolated from both a charge path and a discharge path to provide a hold state.

78. An optical control system as claimed in claim 68, further comprising an emitter drive circuit for one or more of said optical emitters, said emitter drive circuit being operable to pulse said one or more of said emitters with a pulse period less than an operational time of said detection system.

79. An optical control system as claimed in claim 78, wherein said emitter drive circuit is further configured to control a duty cycle of said one or more emitters such that the detection system output is approximately proportional to the emitter duty cycle.

80. An optical control system as claimed in claim 79, wherein said emitter drive circuit is further configured to determine a signal-to-noise ratio of said detection system output, and to control the emitter duty cycle to maintain said signal-to-noise ratio above a predetermined minimum value.

81. An optical control system as claimed in claim 78, wherein said emitter drive circuit is operable to control a plurality of said emitters and to ensure that the activations of said plurality of emitters are staggered in time such that the number of emitters active at any given instant is reduced.

82. An optical control system as claimed in claim 68, wherein said area of optical paths is positioned close to a touchable surface and wherein said optical interaction is the touching of said touchable surface.

83. An optical control system as claimed in claim 82, wherein the touchable surface is the surface of a sheet waveguide and the emitters and detectors are arranged at the edges of the waveguide such that light is transmitted into the waveguide by the emitters and received by the detectors along said multiple intersecting optical paths by total internal reflection within the waveguide, the material of the waveguide being selected such that the amount of light passing along said at least two optical paths is reduced by an optical interaction involving touching said surface of the waveguide to cause leakage of light from the waveguide.

84. An optical control system as claimed in claim 68, wherein said ADC receives a plurality of multiplexed signals from a plurality of said detectors.

85. An optical control device as claimed claim 68, wherein the switch is configured to control an operational time of the detection system, and wherein the switch is adjustable as a function of the amplitude of signal detected by said detection system.

86. An optical control system as claimed in claim 68, wherein said processor is operable to determine whether said predicted final detection system output is likely to exceed an operational input limit of said ADC, and if so, to reduce the integration time.

87. An optical control system as claimed in 86, wherein said processor performs an interpolation of said sampled detection system output to determine a saturation time at which said operational limit of said ADC is likely to be exceeded, and sets said reduced integration time to a value less than or equal to said saturation time.

88. An optical control system as claimed in claim 68, wherein said processor is operable to determine whether said predicted final detection system output is likely to exceed an operational input limit of said ADC, and if so, to supply said predicted final detection system output as an output in substitution for a saturated ADC output.

89. An optical control system as claimed in claim 68, wherein one or more of said optical detectors is configured with a relatively long response time, such that said one or more of said optical detectors acts as an integrator.

* * * * *